May 3, 1966      J. B. KELLY      3,249,215
SUPPORT FOR RELATIVELY MOVABLE COMPONENTS OF A
CENTRIFUGAL MACHINE
Filed Aug. 10, 1964      2 Sheets-Sheet 2
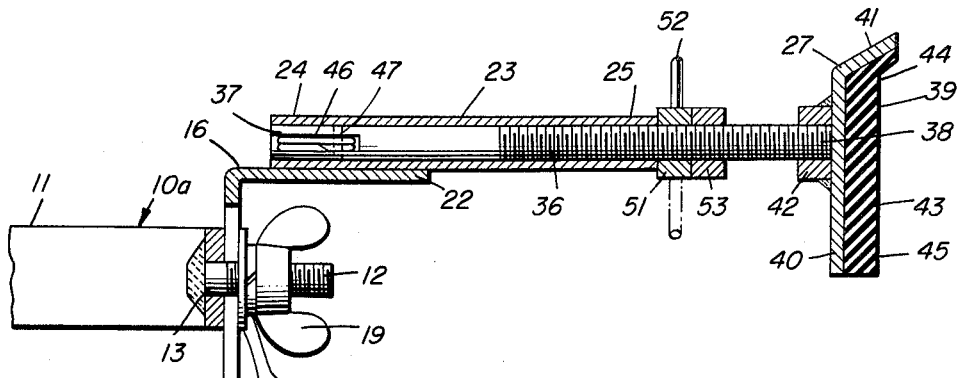
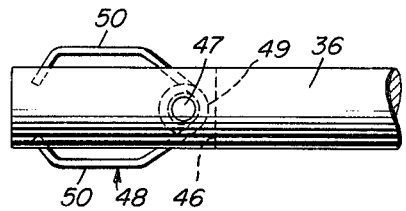
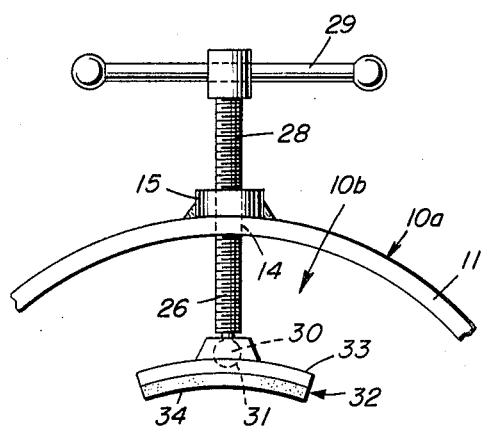
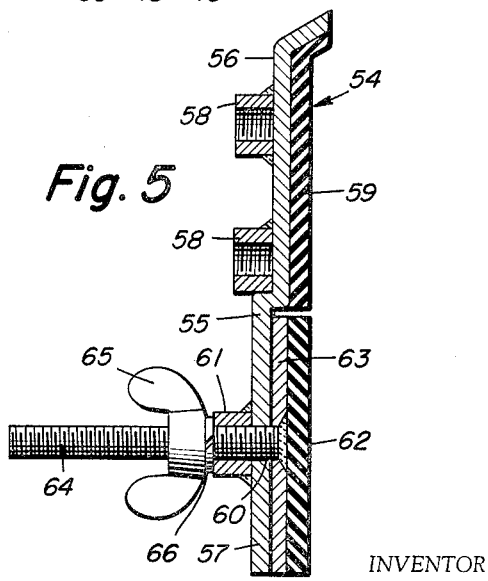
INVENTOR
John B. Kelly
BY
ATTORNEY United States Patent Office 3,249,215
Patented May 3, 1966

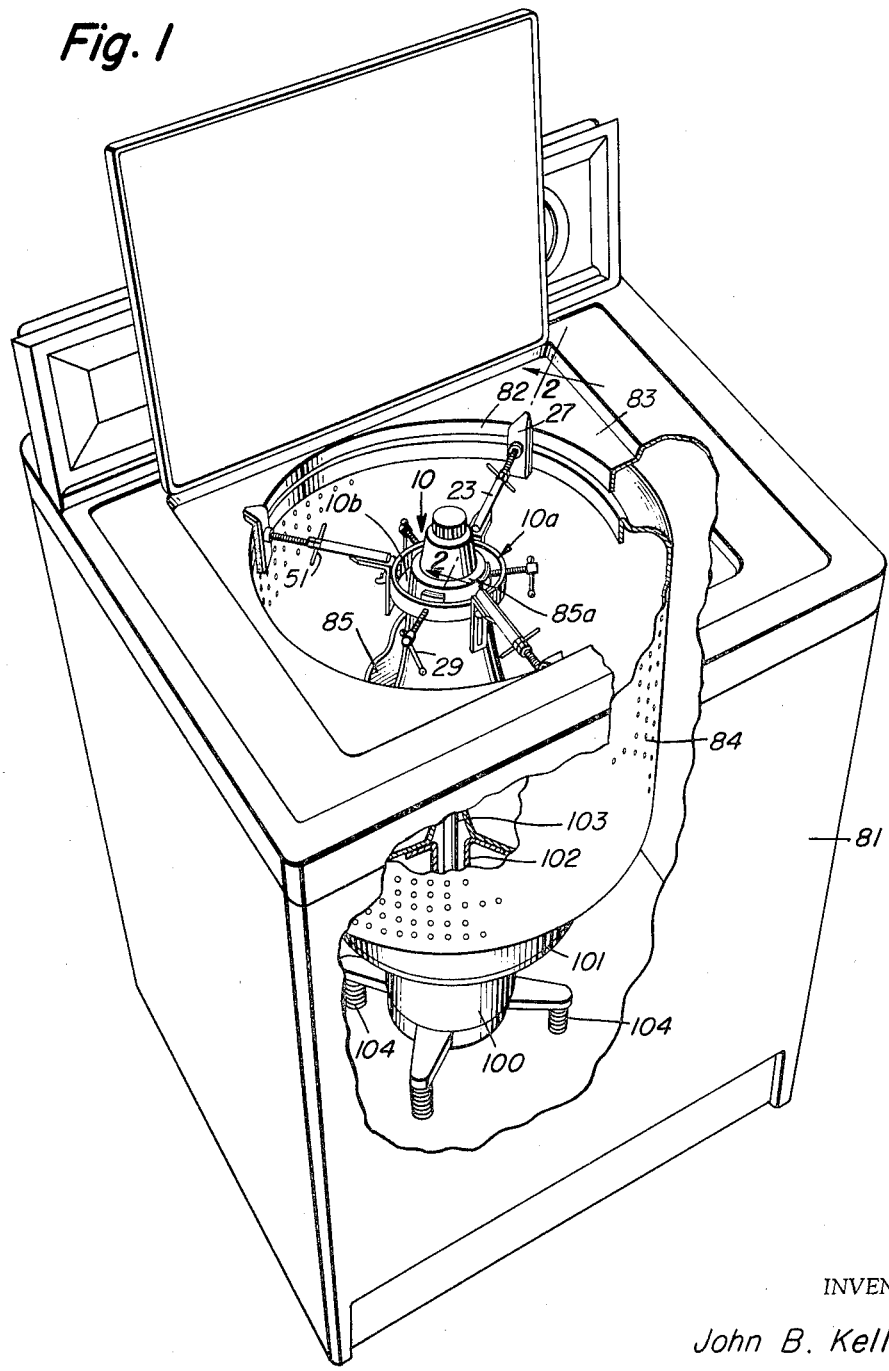

3,249,215
SUPPORT FOR RELATIVELY MOVABLE COMPONENTS OF A CENTRIFUGAL MACHINE
John B. Kelly, 2510 W. 7th Ave., Kennewick, Wash.
Filed Aug. 10, 1964, Ser. No. 388,460
18 Claims. (Cl. 206—46)

The present invention relates to supports, and more particularly to supports for ordinarily relatively movable components of a centrifugal machine to be interengaged for the machine to be shipped and for relative movement of these components thus to be suppressed during shipment.

An object of this invention is the provision of a shipping support for use with a centrifugal extraction machine having a casing wherein opposed portions of the casing border an opening in the casing and a unit including a spin basket is gyratorily movably secured to gyrate within the casing laterally of the axis of the casing opening, and portions of the unit opposing each other laterally of the casing opening extend adjacent to the casing opening, the support serving to suppress movement of the unit relative to the casing while the machine is being shipped.

Another object of this invention is that of providing a shipping support which suppresses movement in a machine of the character indicated through engaging opposed rim portions of the casing which border the casing opening and through engaging opposed rim portions of the spin basket which extend adjacent to the opposed rim portions of the casing.

Another object herein is the provision of a shipping support for use with an agitating and centrifugal extraction machine having a casing wherein opposed rim portions of the casing border an opening in the casing and a unit, having a basket and an agitator within the basket, is gyratorily movably secured to gyrate within the casing laterally of the axis of the casing opening, and opposed rim portions of the basket and opposed hub portions of the agitator respectively extend adjacent to the rim portions of the casing and adjacent to the axis of the casing opening, the support being adapted to engage the opposed portions of the hub and the opposed portions of the casing and suppress movement of the unit relative to the casing.

A further object of this invention is the provision of a support of the character indicated which is adapted to be inserted into the casing opening and be removably clamped in active position to the unit and to the casing.

A still further object of this invention is the provision of a shipping support for use in machines of the character indicated and which acts radially in the casing opening to suppress movement of the gyratorily mounted unit relative to the casing.

Other objects of this invention in part will be obvious and in part pointed out more fully hereinafter.

In the accompanying drawing representing several illustrative embodiments of the present invention:

FIGURE 1 is a perspective view of a support, and introduces schematically a clothes washing and centrifugal extraction machine with emphasis upon those portions of the machine which the support engages;

FIGURE 2 is a section taken along 2—2 in FIGURE 1 with the washing and centrifugal extraction appliance omitted;

FIGURE 3 is a detail plan view corresponding to FIGURE 1 of an inner presser means mounted on a ring of the support with portions of the ring omitted;

FIGURE 4 is a detail view corresponding to FIGURE 1 and represents a tension spring mounted on one end of a rod of the support; and FIGURE 5 is a side view of a modified form of an outer presser foot.

As conducive to a clearer understanding of certain features of this invention, it may be noted at this point that many centrifugal extraction machines in present day usage are equipped with a casing having an opening for the machine to receive a charge which thereafter is subjected to a rotary centrifugal operation of the machine for such purposes as to extract liquid from the charge. A spin basket is within the casing and is disposed so that the inside of the basket is accessible through the casing opening, and so that the spin axis is substantially coaxial with the casing opening when the machine is idle. In certain well known agitating and centrifugal extraction machines there is an agitator in the spin basket and the agitator has a hub which is coaxial with the spin axis of the basket, and substantially coaxial with the casing opening when the machine is idle such as for loading or unloading the basket through the casing opening. The agitator may for example be one which oscillates independently of the spin basket such as to perform a clothes washing function, and the spin basket is one which rotates to extract water from the washed clothes. In the latter operation it is highly beneficial for the machine to tolerate gyratory motion of the unit including the basket and agitator about an axis which is substantially coaxial with the casing opening. This is particularly so because the weight of the clothes is usually not evenly distributed in the basket during the rotary centrifuging operation and the basket tends to gyrate in its mountings due to an imbalance promoted by eccentricity of the load relative to the spin axis. Regardless of any rotational freedom of the spin basket relative to the agitator, it remains that the agitator in the illustrative form of washing and centrifugal extraction machine hereinbefore mentioned will also tend to gyrate with the basket due to the imbalance described, and unless the resulting forces are absorbed this imbalance promotes instability of the machine as a whole. Consequently, the spin basket and agitator in present day machines are usually mounted as members of a unit within the casing so that the common axis of the basket and agitator can gyrate within permissible limits about an axis which is substantially coaxial with the casing opening. The axis of the agitator and of rotation of the spin basket corresponding to a unit including the agitator and spin basket, and sometimes further including power drive means for the latter two components, thus can shift and the amplitude of the gyratory motion is controlled through the medium of springs or other resilient means, thus rendering the machine far less prone to the effects of imbalance. There are of course other centrifugal extraction machines, whether equipped with an agitator or not, which similarly accommodate a charge and tolerate gyrating motion of the spin basket under the imbalance produced by the charge, even though there may be no agitator in the unit which includes the spin basket.

Machines in a more general category which includes those of the foregoing types, and other related types, are subjected to demands for having the spin basket more fully constrained relative to the machine casing for such purposes as shipment. Otherwise, jolts which are generally inherent in shipment and handling of the machine for transfer may be so severe that when applied to the machine as while other than in its normal useful position will cause damaging movements within the machine.

It is accordingly an outstanding object of this invention to provide a support which is portable and can be easily and reliably mounted on a centrifugal extraction machine, which support effectively suppresses movement of a gyratorily mounted unit within the machine casing to within safe limits for the machine to be handled through shipment, and which support is demountable from the machine for the machine thereafter to be put into its normal mode of operation.

Referring now more particularly to a practice of the present invention consistent with the embodiment of FIGURES 1 to 4 of the drawing, a support 10 comprises a body 10a and presser means wherein relatively movable opposed first presser portions are mounted on the body for the support to be moved into the opening 82 of a centrifugal extraction machine casing 81 and removably engage opposed portions of the casing at the rim of the casing opening, and second relatively movable presser portions are mounted on the body 10a and removably engage opposed portions of a unit, the latter being a unitarily movable component of the machine and being gyratorily mounted within the casing 81. The support accordingly securely interconnects the aforementioned unit and the machine casing for the machine thus to be shipped. Moreover, the support lends itself to removal at destination of the machine for the machine thereafter to be operated in normal manner. In the particular exemplary form of centrifugal extraction machine noted in FIGURE 1 the gyratorily mounted unit includes an upwardly open spin basket 84 accessible through the casing opening 82, an agitator 85 in the basket and having an upwardly directed hub 85a axially of the agitator and projecting adjacent to the casing opening 82, and the gyratorily mounted unit further includes a motor 100 having power input connection in a well known manner with a transmission 101 and with power output shafts 102 and 103 through the transmission, which shafts respectively are drivingly connected with the spin basket 84 and with the agitator 85 and are coaxial with the basket and agitator and with each other. In one typical instance, the motor and drive connections including the transmission are so constructed that the agitator 85 and its shaft 103 are axially driven to effect a clothes washing operation, such as by axially turning in an oscillatory movement, while the basket 84 and its shaft 102 are idle, and so that the basket and its corresponding drive shaft may be rotated unidirectionally at high speed in a centrifuging phase of operation of the machine to extract water from the clothes in the basket after completion of the aforementioned washing operation. The mounting which permits the unit in the latter machine to gyrate includes springs 104 or other suitable resilient means interconnecting the housing of motor 100 with the base of casing 81 of the machine, and biasing the unit so as to maintain the spin basket 84 and casing opening 82 substantially coaxially relatively disposed when the machine is idle. Yet the biasing means tolerates gyratory motion of the spin basket with respect to the machine casing 81 and laterally outwardly from the axis of the casing opening 82 during the centrifuging phase of operation of the machine in response to an imbalance being created by the clothes load. With the use of a mounting that permits a gyratory motion of the general character there comes a need for effectively preventing this freedom when the machine is being shipped, for otherwise jolts of such magnitude could be encountered which would cause the unit including the spin basket to be deflected laterally of the casing opening to an extent causing damage.

Turning now more specifically to the embodiment of the present invention represented by the support 10 in FIGURES 1 to 4, the body 10a has a central opening 10b formed by a ring body portion 11. An inner presser means 26 of the support 10 includes a plurality of opposed externally threaded members 28, each of which extends radially into the central opening 10b and has its thread engaging a corresponding internal thread formed on the ring within an aperture 14 radially through the ring and an outward protuberance 15 of the ring. While the ring 11 is illustrated in the drawing as being circular in shape it may of course instead be rectangular, hexagonal, or of any other appropriate shape. Each member 28 is equipped with a handle 29 suitably fastened thereto on an extension of the member radially externally of the ring 11. At the inner end, each member 28 is provided with a ball-shaped portion 30 which fits into a socket 31 forming a part of the rear wall of an inner presser foot 32 mounted on the member. The several inner presser feet 32 include corresponding relatively rigid plates 33 which oppose each other and are curved slightly to conform at least generally to the curvature of corresponding opposed portions of the outer surface of the hub 85a of the agitator 85. Each presser foot 32 further includes a pad 34 which is bonded to the plate 33 and conforms generally to the curvature of the plate. Pads 34 preferably are of a resilient material such as rubber or a suitable synthetic resin.

When the handles 29 are turned to advance the presser feet 32 inwardly within the ring opening 10b and toward the hub of the agitator, the presser feet 32 will turn with the handles 29. When, however, slight contact has been made between a pad 34 and the agitator hub the agitator will hold the related presser foot from any additional rotary motion, although due to the ball and socket mounting between each member 28 and the related presser foot 32, the presser foot still can be advanced radially inwardly in opposition to the other presser feet 32 until all of the pads 34 finally resiliently engage the opposed portions of the agitator hub and securely clamp the support 10 to the agitator.

An outer presser means 27 of the support 10 includes a plurality of rods 36 each having an inner smooth portion 37 and a threaded outer portion extending to the outer end 38 of the rod. The inner rod portions 37 are positioned axially slidably within corresponding ones of the outwardly open tubes 23 and the outer ends 38 of the rods carry a plurality of individually corresponding presser feet 39 mounted thereon. Each outer presser foot has a relatively straight rigid backing plate 40 and an upwardly and outwardly directed flange 41 on the upper edge of the plate. The rear surface of the backing plate 40 has a rearwardly extending internally threaded member 42 made integral therewith as by welding. The thread in the member 42 corresponds in pitch and diameter to the external thread of the corresponding rod 36 and thus is firmly engaged with the threaded end 38 of the rod to achieve a desired reach of the presser foot 39 laterally of the rod. Each presser foot 39 further is equipped with a presser pad 43 comprising a facing of any suitable resilient material such as rubber, vinyl resin or the like, bonded to the front surface of the plate 40. Actually a first portion 44 of the pad 43 is for engaging the appliance casing 81 at the rim of the casing opening 82 and pad 43 has an integral extension 45 for engaging the inside surface of the rim of spin basket 84; however, where as in the present embodiment the support is equipped with means such as the inner presser means 26 to engage the agitator of the unit, reliance sometimes is placed solely upon foreshortened pads 43 on the presser feet 39 for the pads to engage only opposed portions of the appliance casting 81 at the rim of the casing opening 82.

Body 10a of the support has a plurality of opposed extensions projecting radially outwardly from the ring 11 and which engage the outer presser means 27. In accordance with the present embodiment the latter extensions are furthermore inclusive of means for their outer ends to be laterally shifted with respect to the corresponding radial directions of the extensions, and for this purpose the ring 11 comprises a plurality of externally threaded opposed studs which project radially outwardly from the central opening 10b and are secured to the ring 11 at their inner ends 13 at intervals between the members 28 of the inner presser means, as by welding to the ring. A plurality of L-shaped projections 16 corresponding in number to the number of studs 12 are secured to the ring. Each projection 16 may be substantially identical to the others and thus each includes a first leg 17 which has an elongated opening 18 of slightly greater width than the diameter of the corresponding stud 12. To secure each projection 16 to the ring the elongated opening 18 is positioned to receive the corresponding stud 12, and the leg 17 is brought up tight against the exterior of ring 11 by means of a wing nut 19 having a thread which cooperates with the thread of the stud 12 and tube 23 to the desired position, and then are situated on the stud between the wing nut 19 and the leg 17. A second leg 22 of each projection 16 includes an outwardly open tube 23 axially directed radially outwardly with respect to the central opening 10b of the ring 11. An inner end 24 of the tube is welded or otherwise securely on the corresponding leg 22 of the projection 16. The position of each projection 16 relative to the ring 11 thus can be adjusted by loosening the related wing nut 19, sliding the projection laterally in a direction which is transverse to the axes of the related stud 12 and tube 23 to the desired position, and then re-tightening the associated wing nut 19. The thus permissible shift of the projections 16 renders the support 10 more adaptable for achieving installation thereof on a greater variety of types of centrifugal extraction machines, though for particular purposes this feature is not essential and may be omitted as by securing the inner ends 24 of the tubes 23 directly to the ring 11.

The inner portion 37 of each rod 36 is provided with an elongated slot 46 and there is a pin 47 extending through the rod 36 and bridging the slot. A spring 48 is disposed in the slot and includes a convolute portion 49 which surrounds the pin 47. The spring 48 further has opposed arms 50 which are biased by the convolute portion to extend radially outside the outer surface of the rod 36. The distance between the arms 50 is greater than the inside diameter of the tubular extension 23 when the spring is in a relaxed position and so when the rod 36 is mounted within the corresponding tube 23 the spring arms 50 bear compressionally against the inner surface of the tube. The spring 48 thereby provides means for preventing the rod 36 from moving relative to the tube 23 unless sufficient force is exerted on the rod 36 to overcome the frictional resistance between the spring arms 50 and the inner surface of the tube.

Internally threaded adjusting devices 51, each having its thread engaging the external thread of a corresponding one of the rods 36, include handles 52 for the devices to be manually rotated. When the inner ends 37 of rods 36 are in the corresponding tubes 23 and devices 51 are turned in directions toward the inner ends of the rods, the devices 51 will come to bear against the outer ends 25 of the tubes 23. Any additional movement of a device 51 in the same direction with a force great enough to overcome the frictional resistance offered by the arms 50 of the spring 48 against the inner surface of the tube 23 will cause the rod 36 to be advanced outwardly of the tube. A corresponding lock nut 53 radially outside each device 51 and in engagement with the external thread of the associated rod 36 is tightened to the device when the desired adjusted position of the rod 36 relative to the tube 23 has been reached. The several rods 36 carrying the outer presser feet 39 are thereby relatively movably interconnected with each other and are operable to be moved radially outwardly with respect to the central opening 10b and thus engage the support 10 at their pads 43 to opposed portions of the machine casing 81 at the rim of the casing opening 82. This in conjunction with the hub of the agitator 85 being securely engaged by the pads 34 on the inner presser feet 32 substantially immobilizes the gyratory unit laterally with respect to the casing opening 82 so that the machine can safely be shipped.

To install the support 10, the ring 11 is grasped in one hand and is positioned in the central region of the casing opening 82. The outer presser means 27 are moved outwardly with the other hand until the first presser portions 44 contact the casing 81 in opposed relationship to each other around the rim of opening 82. Because the presser feet 39 carrying the presser portions 44 are adjustable radially of the ring opening 10b, it is possible to dispose the support 10 so that the ring 11 initially is approximately coaxial to the casing opening 82. In this, the rods 36 are slidably axially moved manually in the tubes 23 against the frictional restraint of springs 50, until the outer presser feet 39 are brought into contact with the wall 83 of the casing. Before the presser portions 44 are finally tightened into firm engagement with the wall 83 of the casing, the flanges 41 on the presser feet 39 serve to constrain the support 10 against dropping into the opening 82. Now by rotating the adjusting devices 51 into contact with the outer ends of the tubes 23, the first presser portions 44 are forced firmly against the rim of the casing opening 82 and the support 10 thus is substantially fixed in position relative to the casing 81. The rim of the spin basket 84 has approximtaely the same inside diameter as the casing opening 82 in the machine illustrated at FIGURE 1 and the second presser portions 45 therefore extend into engagement with the inside of the rim of the spin basket 84. The spin basket 84 thus is substantially fixed in position relative to the support 10 and any movement between the spin basket 84 and casing 81 is effectively suppressed. Because the unit including the spin basket 84 and agitator 85 is gyratorily movably mounted, the agitator is also suppressed by the foregoing interconnection of the basket and casing.

Before securing the support 10 to the machine, it may be that the tubular members 23 of the projections 16 require a preliminary lateral positioning for the presser portions 44 and 45 ultimately to contact respectively the machine casing and the spin basket, in which event the appropriate wing nut or nuts 19 are loosened and the associated projection 16 is shifted laterally of the corresponding stud 12 and in a direction generally parallel to the axis of body opening 10b until the presser foot 39 carried by the projection will indeed meet the casing wall and the spin basket as described, the loosened wing nut or nuts 19 are tightened to secure the adjustment.

Although in the present embodiment the presser feet 39 directly engage the support 10 to both the machine casing and the rim of the spin basket, as just described, the ring 11 nevertheless receives the hub 85a of the agitator 85 in the support body opening 10b for achieving a further connection of the support 10 with the gyratorily mounted unit, the further connection being beneficial for such purposes as to enhance the affixation of the support 10 to the machine and at the same time counteract possible tendencies of the agitator 85 to turn axially or vibrate as a member of the machine during shipment of the machine. This additional connection is accomplished by sliding the ring 11 around the hub 85a of the agitator 85 and then by tightening the inner presser means 26 onto the opposed portions of the hub by operation of the handles 29.

Alternatively, the support 10 may initially be secured to the hub 85a of the agitator by engaging the inner presser means 26 with the opposed portions of the hub, so that the ring and hub are substantially coaxially disposed. The outer presser means 27 then are adjusted relative to the ring 11 so that with the projections 16 and outer presser means securely on the ring the outer presser feet 39 meet opposed portions of the rim of opening 82 while the agitator hub and casing opening are substantially coaxially disposed. The outer presser feet 39 then are moved into clamping engagement with the opposed portions of the wall 83 by operation of the manual devices 51 against the ends of tubes 23, thus securing the gyratorily mounted unit to the machine casing 81. Portions 45 of the contact members 43 likewise are moved into clamping engagement with the inner surface of the rim of the spin basket 84. In instances, still in accordance with the present invention, where the outer presser feet 39 will not meet the spin basket of a centrifugal extraction machine, the affixation of the support 10 to the machine casing is still nevertheless being brought into contact with the rim of the casing opening, in which event the agitator is clampingly engaged by the inner presser means 26 for the support to suppress the gyratorily mounted unit of the machine.

FIGURE 5 illustrates in detail a modified outer presser foot 54, a plurality of which feet corresponding in number to the presser feet 39 sometimes being substituted for the latter feet on the outer threaded ends of rods 36 thereby modifying the previously described support 10 to the extent that the substituted feet are present. Each foot 54 includes pad means having relatively movable mountings, there being a rigid mounting or backing 55 having substantially parallel upper and lower portions 56 and 57, the latter being offset rearwardly from the upper portion, and there being a supplemental rigid but movably secured backing or mounting 63 disposed substantially parallel to the lower portion 57 and confronting the outer face of the latter portion of the presser foot. This backing 63 has an externally threaded rigid extension 64 backward in a direction which is substantially normal to the lower portion 57 and is through an aperture 60 in the last mentioned portion. An internally threaded protuberance 61 from the rearward face of lower portion 57 of mounting 55 prolongs the aperture 60 and engages the external threads on extension 64 which carries rearwardly against the protuberance a lock washer 66 and also a wing nut 65, the latter bearing upon the lock washer and engaging the external thread of the extension. The upper portion 56 of the mounting 55 has two spaced upper and lower backward protuberances 58 which are internally threaded and have axes which are substantially parallel to the axis of protuberance 61, thus selectively for the presser foot to be mounted threadedly on the outer end of a corresponding rod 36 in substitution for one of the presser feet 39 of FIGURE 2. Depending upon which of the protuberances 58 is utilized for engaging the presser foot 54 to the corresponding rod 36, a corresponding position of reach of the mounting 55 relative to the rod thus is established. The same is so with reference to the other presser feet 54 which are substituted for the presser feet 39. The upper portion 56 of mounting 55, and the adjustable mounting 63 respectively have resilient pad means 59 and 62, such as of rubber or synthetic resin, bonded to their outer faces, the portion or pad 59 being for contacting the casing opening rim of a centrifugal extraction machine and the portion or pad 62 being for contacting the inner surface of the rim of a spin basket which is gyratorily mounted within the machine casing and has an inside dimension which may substantially exceed the corresponding dimension of the machine casing opening. In the latter event, the wing nuts 65 of the presser feet 54 on the support are loosened and mounting 62, its backing 63 and extensions 64, are advanced manually outwardly in threaded engagement with the protuberance 61 in the instance of each presser foot 54 on the support until the relative positions of pads 59 and 62 compensate for the dimensional difference between the casing opening and the rim of the spin basket and for the upper and lower presser feet 54 respectively to contact the rim of the machine casing opening and the rim of the basket. The wing nuts 65 are tightened against the corresponding lock washers to assure that the pads 59 and 62 will sustain their adjusted relative positions, and the support resulting from the substitution of outer presser feet 54 in the support of FIGURES 1 to 4 for the outer presser feet 39, is installed in a manner which otherwise is similar to that hereinbefore disclosed with reference to FIGURES 1 to 4.

It will also be noted that the outer faces of pads 59 and 62 are susceptible to being adjusted into substantially coplanar relation by achieving a corresponding setting of the mounting 63 with respect to the foot backing member 55 for the support to be used on machines wherein the inside dimensions of the casing opening and the spin basket rim are substantially equal. By such measures as increasing the distance of set back of the lower portions 57 from the corresponding upper portions 56 in the presser feet 54, mountings 55 and 63 may be relatively adjusted as hereinbefore described and yet introduce the further feature of having relative positions available wherein the pads 62 will engage the inside of a spin basket rim that is set in a considerable distance radially from the adjacent rim of the machine casing while pads 59 engage the latter rim.

While supports have been described having utility with appliances wherein a gyratorily mounted spin basket and agitator are provided, at least some of these supports and also others in accordance with this invention may be used on centrifugal extraction machines such as those without an agitator but having a casing and a spin basket gyratorily mounted in the casing so that the rims of the casing opening and basket are adjacent. In the latter event the inner presser means may in fact be omitted and reliance placed upon the interconnection achieved by the outer presser means having relatively movable presser portions mounted on the body of the support to be moved and respectively engage the support to the rim of the spin basket and to the rim of the casing opening.

As the invention lends itself to many possible embodiments, and as many possible changes may be made in the embodiments hereinbefore set forth, it will be understood that all matter described herein is to be interpreted as illustrative and not as a limitation.

I claim:

1. A shipping support for use with a centrifugal extraction machine having a casing wherein opposed portions of the casing border an opening in the casing and a unit is gyratorily movably secured to gyrate within the casing laterally of the axis of the casing opening, and portions of the unit opposing each other laterally of the casing opening extend adjacent to the casing opening, said support comprising a body, and presser means, said presser means including relatively movable opposed first presser portions mounted on said body to be moved in the casing opening into engagement with the opposed portions of the casing and thus secure the support to the casing, and opposed relatively movable second presser portions mounted on said body to be moved into engagement with the opposed portions of the unit and thus secure the support to the unit, whereby the support securely in engagement with the casing and the unit suppresses movement of the unit relative to the casing.

2. The shipping support set forth in claim 1, wherein a said first presser portion includes a member to engage the casing, and a mounting carrying said member, said mounting having an extensible interconnection with the remainder of said first presser portions.

3. The shipping support set forth in claim 1, wherein said first presser portions include first presser members to engage the casing radially of the casing opening, and second presser members having upper flanges extending outwardly over said first members for the support to be restrained by the casing axially of the casing opening.

4. The shipping support set forth in claim 1, wherein said body has a central portion and at least three radial extensions from said central portion, said first presser portions being correspondingly on said extensions, and a said first presser portion having an extensible interconnection with the corresponding one of said extensions for said first presser portion to be moved axially of said corresponding extension.

5. The shipping support set forth in claim 4, wherein said presser portion and said corresponding extension together include two interfitting axially relatively slidable members in said extensible interconnection.

6. The shipping support set forth in claim 5, wherein one of said members has an external thread, and said interconnection further includes an actuating component abutting an end of the other of said members and having an internal thread engaging said external thread for said interconnection to be extended.

7. The shipping support set forth in claim 6, wherein said members support a spring compressed radially between said members and frictionally interengaging said members slidably.

8. A shipping support for use with a centrifugal extraction machine having a casing wherein opposed rim portions of the casing border an opening in the casing and a unit having a basket is gyratorily movably secured to gyrate within the casing laterally of the axis of the casing opening, and opposed rim portions of the basket extend adjacent to the rim portions of the casing, said support comprising a body, and presser means, said presser means including relatively movable opposed first presser portions mounted on said body to be moved in the casing opening into engagement with the opposed rim portions of the casing and thus secure the support to the casing, and opposed relatively movable second presser portions mounted on said body to be moved into engagement with the opposed rim portions of the basket and thus secure the support to the unit, whereby the support securely in engagement with the casing and the unit suppresses movement of the unit relative to the casing.

9. The shipping support set forth in claim 8, wherein a said second presser portion includes a member to engage the unit, and a mounting carrying said member, said mounting having an extensible interconnection with the remainder of said second presser portions.

10. The shipping support set forth in claim 8, wherein said presser means is further characterized by having a presser foot which comprises a said first presser portion and a corresponding said second presser portion relatively movably engaged with each other.

11. The shipping support set forth in claim 10, wherein said presser foot has an extensible interconnection with the remainder of said first and second presser portions.

12. The shipping support set forth in claim 10, wherein said first and second presser portions of said presser foot respectively include a member to engage the casing and a member to engage the basket, and further include relatively movable mountings carrying said members, said mountings having an extensible interconnection with each other.

13. The shipping support set forth in claim 10, wherein said first and second presser portions of said presser foot include resilient pad portions of said foot.

14. A shipping support for use with an agitating and centrifugal extraction machine having a casing wherein opposed rim portions of the casing border an opening in the casing and a unit, having a basket and an agitator within the basket, is gyratorily movably secured to gyrate within the casing laterally of the axis of the casing opening, and opposed rim portions of the basket and opposed hub portions of the agitator respectively extend adjacent to the rim portions of the casing and adjacent to the axis of the casing opening, said support comprising a body, and presser means, said presser means including relatively movable opposed first presser portions mounted on said body to be moved in the casing opening into engagement with the opposed rim portions of the casing and thus secure the support to the casing, and opposed relatively movable second presser portions mounted on said body to be moved into engagement with the opposed hub portions of the agitator and thus secure the support to the unit, whereby the support securely in engagement with the casing and the unit suppresses movement of the unit relative to the casing.

15. A shipping support for use with a washing and centrifugal extraction machine having a casing wherein opposed rim portions of the casing border an opening in the casing and a unit, having a basket and an agitator within the basket, is gyratorily movably secured to gyrate within the casing laterally of the axis of the casing opening, and opposed rim portions of the basket and opposed hub portions of the agitator respectively extend adjacent to the rim portions of the casing and adjacent to the axis at the casing opening, said support comprising a body having a central opening, and presser means, said presser means including relatively movable opposed first presser portions mounted on said body and extending radially outwardly from said body to be moved in the casing opening into engagement with the opposed rim portions of the casing and thus secure the support to the casing, and opposed relatively movable second presser portions mounted on said body and extending into said central opening in the body to be moved into engagement with the opposed hub portions of the agitator and thus secure the support to the unit, whereby the support securely in engagement with the casing and the unit suppresses movement of the unit relative to the casing.

16. The shipping support set forth in claim 15, wherein a said first presser portion includes a member to engage the casing, and a first mounting carrying said member, and a said second presser portion includes a member to engage the agitator, and a second mounting carrying the latter said member, said mountings each having a corresponding axially extensible interconnection with said body.

17. The shipping support set forth in claim 16, wherein said body includes a ring forming said central opening, an outward extension from said ring radially of said central opening being in said extensible interconnection of said first mounting, and said extensible interconnection of second mounting with said body includes interengaging threads respectively on said body and on said second mounting, said threads having an axis radially of said central opening.

18. The shipping support set forth in claim 15, wherein said first presser portions include first members to engage the casing, and first mountings carrying said members, and said second presser portions include second members to engage the agitator, and second mountings carrying the latter said members, said mountings each having a corresponding axially movable interconnection with said body extensible radially of said body, and said first mountings each further having a corresponding movable second interconnection with said body extensible in a direction generally parallel to the axis of said body opening.

References Cited by the Examiner

UNITED STATES PATENTS

| | | | |
|---|---|---|---|
| 1,749,067 | 3/1930 | Cole et al. | 68—4 X |
| 2,931,604 | 4/1960 | Weddle | 248—44 |
| 3,184,048 | 5/1965 | Bjerum | 206—46 |
| 3,187,887 | 6/1965 | Charles et al. | 206—46 |

WILLIAM I. PRICE, *Primary Examiner.*